United States Patent [19]
Kast

[11] 3,995,660
[45] Dec. 7, 1976

[54] FLOW METERING AND DIVIDING VALVE

[75] Inventor: Howard B. Kast, Fairfield, Ohio

[73] Assignee: General Electric Company, Cincinnati, Ohio

[22] Filed: Dec. 8, 1975

[21] Appl. No.: 638,810

[52] U.S. Cl. .......................... 137/625.48; 137/609; 137/610; 137/813

[51] Int. Cl.² .................... F16K 11/06; F15C 1/04

[58] Field of Search ........ 137/625.48, 609, 614.11, 137/813, 610; 251/176

[56] References Cited
UNITED STATES PATENTS
2,715,913   8/1955   Taylor .......................... 251/176 X

*Primary Examiner*—Alan Cohan
*Assistant Examiner*—Gerald A. Michalsky
*Attorney, Agent, or Firm*—Henry J. Policinski; Derek P. Lawrence

[57] ABSTRACT

A fluid metering and flow dividing valve is provided which is particularly adapted for use in a fuel distribution system associated with a gas turbine engine and includes first and second variable area valves. Each valve is comprised of a movable shoe member and a stationary plate member cooperating in sliding frictional engagement to define a variable fluid flow area. A shaft interconnects each movable shoe member and is selectively translatable by actuating means responsive to signal means to effect movement of the movable shoe members to thereby vary the variable fluid flow areas.

7 Claims, 5 Drawing Figures

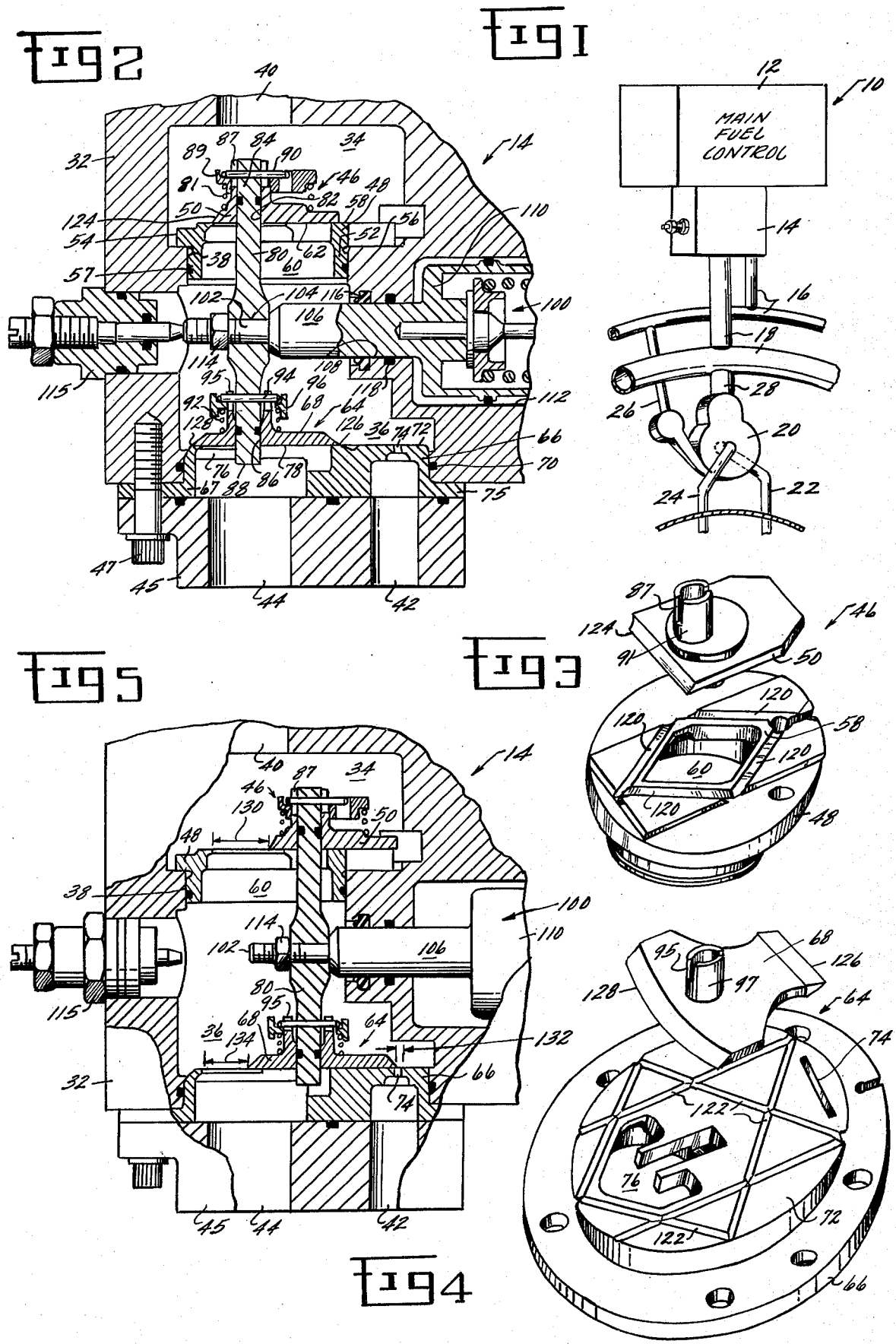

FLOW METERING AND DIVIDING VALVE

BACKGROUND OF THE INVENTION

This invention relates to a fluid metering and flow dividing valve and, more specifically, to such a valve particularly adapted for use in a combustor associated with a gas turbine engine.

In the design of main combustion systems for gas turbine engines, uniform distribution of fuel to each of the combustor burners, which may number as many as 20 burners, is of major importance. It is common practice to position the combustor burners circumferentially about the periphery of the combustor even though variations in fluid flow may result from the different fluid heads associated with the differences in relative height of the burners with respect to each other. Numerous attempts have been made to overcome the variations in flow resulting from differences in fluid head. Recently fluidic valves have been utilized in close proximity to each burner to regulate the delivery of fuel from a common fuel manifold to the burners in a manner to insure that fuel flow is uniformly distributed to all burners.

The aforementioned fluidic valves may generally be comprised of vortex valves in which a control stream of fluid and a supply stream of fluid are each introduced into a common chamber in such a manner that the control stream modifies the flow characteristics of the supply stream. The control stream is utilized to introduce flow impedance in accordance with the flow requirements of the burner. Generally at low fuel flow requirements the impedance introduced by the control stream is high whereas at high fuel flow requirements the impedance introduced is low.

Delivery of both control and supply streams to the vortex valve at specific predetermined pressures and flow rates throughout the range of operating requirements of the combustor is accomplished by the provision of metering and flow dividing valves placed upstream of the vortex valves. Such valves regulate the supply and control streams of fuel in accordance with appropriate input signals and deliver the regulated streams to the vortex valves to effect delivery of the required fuel to the combustor burners. It is of major importance that the metering and flow dividing portions of the fluid distribution system be capable of operating without incurring damage from contaminantes occasionally found in the fuel. For instance, spool-type valves, well known in the art, which require close diametral clearances are susceptible to binding, side-loading and galling, all caused by fuel contamination, and hence spool-type valves have been found to be less than ideal for this application. Additionally, the metering and flow dividing portions of the fuel distribution should be limited to a short fluid flow path to reduce pressure losses in the fuel distribution system and should be compact, lightweight and comprised of a minimum of moving parts. It is also desirable that the metering and flow dividing valve elements be capable of purging any contaminates which may enter the valve with the fuel.

SUMMARY OF THE INVENTION

Therefore, it is a principal object of this invention to provide a fluid metering and flow dividing valve for use in a fluid delivery system.

It is another object of this invention to provide a fluid metering and flow dividing valve which is usable in a fuel delivery system for gas turbine engines.

It is still another object of this invention to provide a fluid metering and flow dividing valve which is operable with fuel contaminates occasionally found in fuel used in gas turbine engines.

It is yet another object of the present invention to provide a fluid metering and flow dividing valve which is compact and lightweight and is comprised of a minimum of moving parts.

These and other objects of the present invention, which will become apparent from the following specification and appended drawings, are accomplished by a fluid metering and flow dividing valve disposed in a housing which includes first and second fluid chambers in serial flow relationship. A first variable area metering valve is provided to meter the flow of pressurized fluid from the first chamber to the second chamber. The first metering valve includes a first stationary plate member having a first aperture disposed therein and a first movable shoe member adapted for sliding frictional engagement with the first plate member and overlapping the first aperture. A second variable area flow dividing valve adapted to divide the flow of fluid out of the second chamber between a pair of fluid outlets includes a second stationary plate member having second and third apertures therein and a second movable shoe member adapted to for sliding engagement with the second plate member and for overlapping of the second and third apertures. Shaft means, interconnecting the first and second movable shoe members, are movable by actuating means responsive to signal means. Biasing means which may be comprised of spring means bias each movable shoe member in frictional engagement with its respective stationary plate. First and second groove means are provided for removing contaminates from between the movable shoe members and the stationary plates.

DESCRIPTION OF THE DRAWINGS

While the specification concludes with claims distinctly claiming and particularly pointing out the invention described herein, the invention is more readily understood by reference to the discussion below and the accompanying drawings in which:

FIG. 1 is a schematic view of the fuel delivery system embodying the present invention;

FIG. 2 is a cross-sectional view of the metering and flow dividing valve comprising the present invention shown in a closed position;

FIG. 3 is an exploded view of a portion of the elements comprising the metering valve embodied in the present invention;

FIG. 4 is an exploded view of a portion of the elements comprising the flow dividing valve embodied in the present invention; and FIG. 5 is a cross-sectional view of the metering and flow dividing valve comprising the present invention shown in an opened position.

DESCRIPTION OF THE PREFERRED EMBODIMENT

Referring now to FIG. 1, a portion of the fuel delivery system embodying the present invention is shown generally at 10 and is comprised of main fuel control 12, control fluid manifold 16, supply fluid manifold 18, and a plurality of vortex valves 20 (only one of which is shown) and conduits 22 and 24 leading to the combustor burners (not shown). Main fuel control 12 includes flow metering and dividing valve 14 which divides the fuel into control and supply flows associated with control fluid manifold 16 and supply fluid manifold 18 respectively. Vortex valve 20 is in fluid communication with both control manifold 16 and supply manifold 18. Control fluid is introduced tangentially into vortex valve 20 via conduit 26 communicating with control fluid 16 and supply fluid is delivered radially to vortex valve 20 via conduit 18 communicating with supply fluid manifold 18. By selectively regulating the pressure and amount of control fluid introduced tangentially into vortex valve 20, the impedance to supply fluid flow path through vortex valve 20 and out of conduits 24 and 22 can be modified. For very low supply fluid flows the pressure of the control fluid is much higher than the pressure of the supply fluid. Consequently, a high impedance to the supply fluid flow is established in vortex valve 20. For high flow rates the ratio of control fluid pressure to supply fluid pressure is much lower than at low flow rates and hence the effective flow impedance is lower through vortex valve 20 and conduits 22 and 24. Reference to U.S. Pat. No. 3,750,396 will provide a more complete description of the operation of the vortex valve 20 in a fluid delivery system.

FIG. 2 depicts a cross-sectional view of the metering and flow dividing valve 14 comprising the present invention. Valve 14 is comprised of housing 32 which includes first and second fluid chambers 34 and 36 arranged in serial flow relationship in house 32. Passageway 38 is disposed in housing 32 and establishes fluid communication between chamber 34 and 36. Fluid inlet 40 allows pressurized fluid from other portions of main fuel control 12 to enter chamber 34. Parallel fluid outlets 42 and 44 disposed within chamber end-cap 45 secured to housing 32 by bolts 47 provide for the passage of fluid from chamber 36 into control fluid manifold 16 and supply fluid manifold 18.

First variable area metering valve, shown generally at 46, resides in chamber 34 adjacent passageway 38 and is comprised of a first stationary plate member 48 and a first movable shoe member 50. Plate member 48 includes a generally cylindrical portion 52 disposed in passageway 38 and a flange portion 54 which abuts a shoulder 56 formed in housing 32. Seal 57 prevents passage of fluid through the clearance between cylindrical portion 52 and passageway 38. Plate member 48 further includes a generally flat valve seat portion 58 disposed in chamber 34. Aperture 60 extends from seat portion 48 through plate member 48 thereby establishing fluid communication between chamber 34, passageway 38 and chamber 36.

Movable shoe member 50 includes a generally flat sealing surface 62 in sliding frictional engagement with seat portion 58 of stationary plate member 48. Shoe member 50 is disposed to selectively overlap all or part of aperture 60 so as to define therewith a first variable fluid flow area. As viewed in FIG. 1, shoe member 50 completely overlaps aperture 60 and hence fluid is prevented from passing from chamber 34 to chamber 36.

A second variable area flow dividing valve, shown generally at 64, resides in chamber 36 adjacent fluid outlets 44 and 42 of end-cap 45 and is comprised of a second stationary plate member 66 and a second movable shoe member 68. Plate member 66 includes a cylindrical portion 67 residing in chamber 36 and a flange portion 75 retained between housing 32 and chamber end-cap 45. Seal 70 seals chamber 36 from the atmosphere. Plate member 66 further includes a second generally flat valve seat portion 72 disposed in chamber 36. A pair of apertures 74 and 76 each extend from seat portion 72 through plate member 66 thereby establishing fluid communication between chamber 36 and fluid outlets 42 and 44, respectively.

Movable shoe member 68 includes a generally flat sealing surface 78 in sliding frictional engagement with seat portion 72 of stationary plate member 66. Shoe member 68 disposed to selectively overlap all or part of apertures 74 and 76 so as to define therewith second and third variable fluid flow areas respectively. As viewed in FIG. 1, shoe member 68 completely overlaps aperture 76 but does not overlap any portion of aperture 74.

An elongated rod or shaft 80 interconnects movable shoe member 50 and movable shoe member 68 such that both shoe members 50 and 68 slide in unison in frictional engagement with and across their respectively associated stationary plate members 48 and 66. More specifically, movable shoe member 50 includes an aperture 82 adapted to receive one end 84 of shaft 80 and movable shoe member 68 includes an aperture 86 adapted to receive the other end 88 of elongated shaft 80. Both shoe members 50 and 68 are free to move in the longitudinal direction of shaft 80.

Shoe member 50 is biased into frictional engagement with stationary plate member 48 by biasing spring 81. Biasing spring 81 is captured between shoe member 50 and a spring support 89 journaled to end 84 of shaft 80 by journal pin 90. Journal pin 90 also passes through slot 87 shown in FIG. 3 in a stem portion 91 of shoe member 50 to prevent rotation of shoe member 50 with respect to shaft 80. In a similar manner biasing spring 92 biases shoe member 68 into frictional engagement with stationary plate member 66. Journal pin 94 retains spring support 96 on end 88 of shaft 80 and passes through a slot 95 in stem portion 97 of shoe member 68 for anti-rotation purposes. Spring 92 is captured between stationary plate member 66 and spring support 96. Both biasing springs 86 and 92 are precompressed such that when disposed in the manner described above, shoe members 50 and 68 will be biased into engagement with their respectively associated plate members.

An actuating piston 100 resides in housing 32 and provides means for sliding both shoe members 50 and 68 on their respective stationary plates 48 and 66. More specifically, actuating piston includes a reduced diameter portion 102 extending through an aperture 104 centrally located in shaft 80, an intermediate diameter portion 106 partially residing in chamber 36 and extending through an aperture 108 in housing 32 and an enlarged diameter portion 110 residing in a third chamber 112 in housing 32. Actuating piston 100 is secured to shaft 80 by nut 114 threaded onto reduced diameter portion 102. Seal members 116, 118 isolate chamber 36 from chamber 112. Piston 100 is adapted for translation to the right and left (as viewed in FIG. 1) and such translation may be accomplished by appropriate mechanical, hydraulic or electrical control signals (not shown). Piston stop assembly 115 is provided in housing 32 to limit leftward movement of actuating piston 100.

Referring now to FIG. 3, which depicts stationary plate member 48 and movable shoe member 50 in an exploded view, a plurality of interconnecting grooves 120 are formed in flat valve seat portion 58 of stationary plate member 48. When movable shoe member 50 is in frictional engagement with plate member 48, a portion of grooves 120 are disposed therebetween with the remaining portion communicating with chamber 34. Similarly, as viewed in FIG. 4, stationary plate member 66 is provided with a plurality of grooves 122 formed on flat valve seat portion 72. When movable shoe member 68 is in frictional engagement with stationary plate member 66 a portion of grooves 122 are disposed therebetween with the remaining portion communicating with chamber 36. Grooves 120 and 122 are provided for a purpose hereinafter to be described.

As viewed in FIGS. 3, 4 and 5, movable shoe member 50 is provided with a first metering edge 124 and movable shoe member 68 is provided with second and third metering edges 126 and 128. First metering edge 124 defines with aperture 60 a first variable fluid flow area 130. Second metering edge 126 and third metering edge 128 define with apertures 74 and 76, second and third variable fluid flow areas 132 and 134 respectively.

Operation of metering and flow dividing valve 14 will now be described with reference to the drawings including FIG. 5. At low flow requirements, that is when the gas turbine engine associated with the fuel distribution system 10 is operating below or at idle speeds, the vortex valve 20 is in a condition of high impedance such that fuel is delivered to the combustor through conduits 24 and 22 at a low flow rate. In the high impedance condition, control flow of fuel delivered tangentially into vortex valve 20 through conduit 26 is at a relatively high pressure as compared to the supply flow of fuel delivered to vortex valve 20 through conduit 28. The high ratio of control fluid pressure to supply fluid pressure results in fuel swirl within the vortex valve hence impeding the flow of supply fuel therethrough. In the high impedance condition metering and flow dividing valve 14 is disposed such that variable fluid flow areas 130 and 134 are only partially and minimally opened while variable fluid flow area 132 is fully opened (in this condition metering edge 126 is not in overlapping relationship with aperture 74 and fluid flows unrestricted through aperture 74). The pressure drop across fluid flow area 134 is hence much greater than the pressure drop across unrestricted aperture 74. Consequently fuel flowing through outlet passage 44 is at a pressure much less than fuel flowing through outlet passage 42.

Fuel delivered by the main fuel control 12 to chamber 34 is metered through variable fluid flow area 130, passes through aperture 60 and passage 38 into chamber 36. The fuel flow is then divided by second flow dividing valve 64 with a portion of the fuel passing through variable fluid flow area 134 to outlet passage 44 and the remaining fuel passing through unrestricted aperture 74 to outlet passage 42. Outlet passage 44 is connected to fuel supply manifold 18 and outlet passage 42 provides for delivery of fuel to fuel control manifold 16.

As the demand for fuel increases the amount of impedance imposed by aby vortex valve 20 decreases. Decreased impedance is achieved by altering the pressure ratio of control fuel to supply fuel. As the pressure ratio decreases, the effect of tangentially introduced control fuel stream upon the radially introduced supply fuel stream is reduced and hence supply fuel flows more freely through vortex valve 20 and into conduits 24 and 22. Alteration of the pressure ratio is achieved by the metering and flow dividing valve 14 in a manner now to be described.

As the demand for fuel increases, other portions of the main fuel control 12 deliver fuel through inlet 40 into chamber 34 at an increased flow rate. Additionally, piston 100, in response to an appropriate mechanical, hydraulic or electrical signal, translates to the right (as viewed in FIG. 1) moving shaft 80 in the same direction. Consequently movable shoe members 50 and 68 which are secured to shaft 80 in a manner hereinbefore described are slidingly translated to the right across their respective stationary plate members 48 and 66. Movement of shoe members 50 and 68 in this manner increase the flow areas of both variable fluid flow area 130 and variable fluid flow area 134. The increase in variable fluid flow area 134 reduces the pressure drop between chamber 36 and outlet conduit 44. Since the pressure ratio of control fuel pressure flowing out of conduit 42 and supply fuel pressure flowing out of conduit 44 depends upon the pressure drop between chamber 36 and each of the outlet conduits 42 and 44 and since the pressure drop between chamber 36 and outlet conduit 44 is reduced by an increase in variable fluid flow area 134, the aforementioned pressure ratio is reduced which, in turn, lowers the impedance in vortex valve 20. A decrease in impedance combined with the increase in fuel flow delivered by the main fuel control permits fuel to be delivered by vortex valve 20 to the combustor burners at an increased flow rate.

Movable shoe member 68 is designed with a predetermined length such that it may translate to the right (as viewed in FIG. 1) by a predetermined distance without overlapping aperture 74. During operation at intermediate fuel flow demands it has been found that the aforementioned pressure ratio can be sufficiently reduced simply by increasing the area of variable fluid flow area 134. At high fuel flow demands, movable shoe member 68 is translated substantially to the right whereby it overlaps aperture 74. In this position variable fluid flow area 132 is decreased. Consequently the aforementioned pressure ratio is reduced not only by increasing variable fluid flow area 134 but also by reducing variable fluid flow area 132. Eventually, when movable plate member 68 translates completely to the right, aperture 74 will be completely covered and hence the magnitude of variable fluid flow area 132 will be zero. In this condition, the control fuel cannot enter vortex valve 20 through manifold 16 and conduit 26 and hence the impedance in vortex valve 20 will be minimized.

Another important feature of the present invention will now be discussed. During operation of a gas turbine engine contaminates carried in the fuel occasionally enter the fuel distribution system. In commonly used spool-type valve these contaminates may become wedged between the tight clearances between the spool lands and the cylinder in which the spool resides. Constant translation of the spool can cause galling, binding and side-loading of the spool. The present invention is well adapted to overcome the deleterious effects of contaminates in the following manner.

Since shoe members 50 and 68 are spring loaded directly against their respective valve seats 58 and 72 by biasing springs 81 and 92, comtaminates have no clearance in which to reside. However, even in the unlikely event contaminates should enter either chamber 34 or 36 and become interposed between shoe member 50 and valve seat 58 of stationary plate 48 or between shoe member 68 and valve seat 72 of stationary plate 66, such contaminates will not result in binding, side-loading or galling of the valve assemblies. Specifically, resilient biasing springs 81 and 92 permit each movable shoe member to be displaced upward (as viewed in FIG. 1 by the contaminates interposed as described above. Since biasing springs 81 and 92 are only lightly preloaded, damage associated with wedging of contaminates between two fixed and immovable surfaces cannot occur. Constant translation of shoe members 50 and 68 may serve to cause the contaminates to be rolled across the plates 48, 66 and eventually into grooves 120 and 122 from whence they are carried by the flow of the rushing fuel out of valve 14. Additionally, grooves 120 and 122 serve to permit pressurized fuel to enter partially between shoe member 50 and plate 48 and between shoe member 68 and plate 66, thereby back-pressuring shoe members 50 and 68 to reduce the sliding friction between shoe members 50, 68 and their respectively associated fixed plates 48 and 66. Disposition of grooves 120 and 122 in this manner serves to eliminate damage caused by contaminates by reducing the force tending to press the shoes and plates together which would otherwise cause the contaminate to gall the surfaces of the shoes or plates.

It should be obvious to those skilled in the art that certain changes could be made in the aforedescribed metering and flow dividing valve without departing from the scope of the invention as delineated by the appended claims.

I claim:
1. A fluid metering and flow dividing valve comprising:
   a housing:
   first and second fluid chambers disposed in serial flow relationship in said housing:
   a fluid inlet adapted to provide fluid under pressure to said first chamber;
   a passageway establishing fluid communication between said first and second fluid chambers;
   a first variable area metering valve adapted to meter the flow of pressurized fluid from said first chamber through said passageway to said second chamber, said first metering valve including a first stationary plate member having a first aperture disposed therein, a first movable shoe member adapted for sliding frictional engagement with said first plate member and for overlapping of said first aperture;
   a second variable area flow dividing valve adapted to divide the flow of fluid out of said second chamber between a pair of fluid outlets in said housing, said second dividing valve including a second stationary plate member having second and third apertures disposed therein, a second movable shoe member adapted for sliding frictional engagement with said second plate member and for overlapping of said second and third apertures;
   shaft means interconnecting said first and second movable shoe members;
   actuating means associated with said shaft means and responsive to signal means for selectively displacing simultaneously said shaft means and said first and second movable shoe members.

2. The invention as set forth in claim 1 further comprising
   a first metering edge disposed on said first movable shoe member and defining with said first aperture a first variable fluid flow area, said first metering edge being movable with said first movable shoe member to vary said first variable fluid flow area;
   second and third metering edges disposed on said second movable shoe member and defining with said second and third apertures, second and third variable fluid flow areas respectively, said second and third metering edges being movable with said second movable shoe member to vary said second and third variable fluid flow areas respectively.

3. The invention as set forth in claim 1 further comprising:
   first biasing means adapted to maintain said first movable shoe member in sliding frictional engagement with said first stationary plate member and further adapted to permit at least partial disengagement of said first plate member and first shoe member.

4. The invention as set forth in claim 3 further comprising:
   second biasing means adpated to maintain said second movable shoe member in sliding frictional engagement with said second stationary plate member and further adapted to permit at least partial disengagement of said second plate member and said second shoe member.

5. The invention as set forth in claim 4 wherein said first and second biasing means are comprised of first and second spring means respectively, said first and second spring means biasing said first and second movable shoe members in the same direction.

6. The invention as set forth in claim 5 further comprising
   first groove means disposed between said first movable shoe member and said stationary plate member, said first groove means communicating with said first chamber, said first groove means providing a first path for the transportation of contaminates from between said first movable shoe member and said first stationary plate member and into said first chamber.

7. The invention as set forth in claim 6 further comprising:
   second groove means disposed between said second movable shoe member and said second stationary plate member, said second groove means communicating with said second chamber, said second groove means providing a second path for the transportation of contaminates from between said second movable shoe member and said second stationary plate member and into said second chamber.

* * * * *